(12) United States Patent
Woittennek et al.

(10) Patent No.: US 8,068,220 B2
(45) Date of Patent: Nov. 29, 2011

(54) APPARATUS FOR TREATING A MATERIAL AND METHOD FOR OPERATING THE SAME

(75) Inventors: Franziska Woittennek, Dresden (DE); Mathias Wölfel, Erlangen (DE); Klaus Vogler, Eckental (DE); Olaf Kittelmann, Berlin (DE)

(73) Assignee: Wavelight AG, Erlangen (DE)

( * ) Notice: Subject to any disclaimer, the term of this patent is extended or adjusted under 35 U.S.C. 154(b) by 85 days.

(21) Appl. No.: 12/621,186

(22) Filed: Nov. 18, 2009

(65) Prior Publication Data

US 2011/0116082 A1    May 19, 2011

(51) Int. Cl.
*G01J 1/42* (2006.01)
(52) U.S. Cl. ....................................... 356/218
(58) Field of Classification Search ............... None
See application file for complete search history.

(56) References Cited

U.S. PATENT DOCUMENTS

| | | |
|---|---|---|
| 2004/0199150 A1 | 10/2004 | Lai |
| 2005/0163174 A1 | 7/2005 | Nakayama et al. |
| 2009/0185587 A1* | 7/2009 | Koshimae et al. ............ 372/22 |

FOREIGN PATENT DOCUMENTS

| | | |
|---|---|---|
| EP | 1281378 A1 | 2/2003 |
| EP | 1748312 A1 | 1/2007 |
| EP | 2109197 A1 | 10/2009 |

OTHER PUBLICATIONS

International Search Report and Written Opinion mailed Aug. 3, 2010 regarding corresponding PCT application No. PCT/EP2009/008209, 13 pages, International Searching Authority, Netherlands.

* cited by examiner

*Primary Examiner* — Tu Nguyen
(74) *Attorney, Agent, or Firm* — Haynes and Boone, LLP

(57) ABSTRACT

A laser-assisted material-machining device comprises a laser (14) for providing a pulsed laser beam (16), a measuring arrangement (30, 32, 34, 36, 38) in order to obtain measured values of a fundamental-wave power of the laser beam and also of a power of at least one higher harmonic generated from the laser beam by frequency multiplication, and an evaluating unit (22) connected to the measuring arrangement, which has been set up to examine the quality of the laser beam (16) in a manner depending on the measured fundamental-wave power, on the measured power of the higher harmonic, and on a set radiant power of the laser (14). By formation of the quotient of the measured fundamental-wave power and of the measured power of the higher harmonic, the current conversion efficiency of the frequency multiplication can be ascertained. Said conversion efficiency is a measure of the quality of the wavefront and of the pulse duration of the laser beam (16).

21 Claims, 1 Drawing Sheet

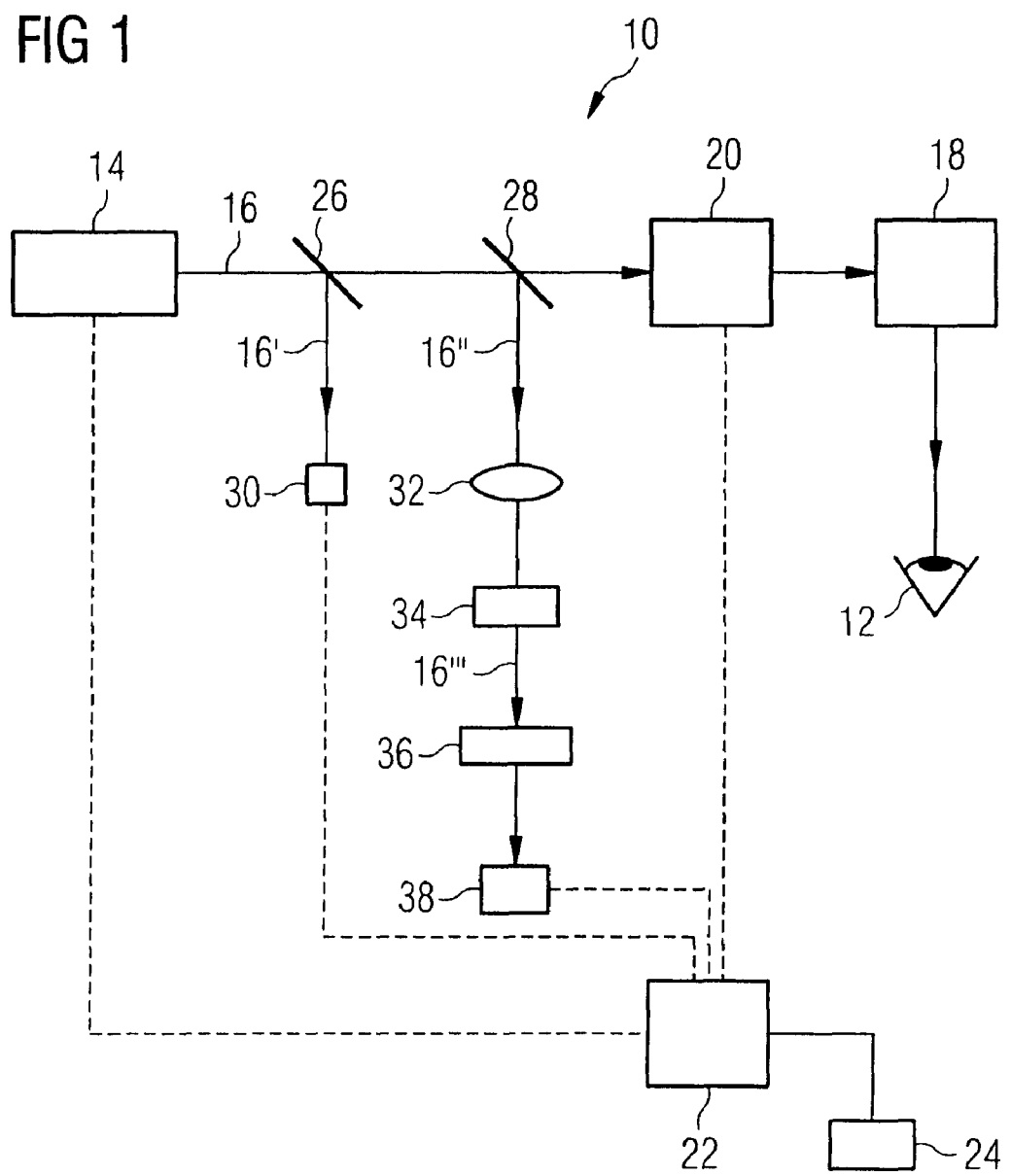

APPARATUS FOR TREATING A MATERIAL AND METHOD FOR OPERATING THE SAME

BACKGROUND

The invention relates to a device for machining a material with a pulsed laser beam. The invention further relates to a process for operating such a material-machining device.

In principle, the invention is applicable in the field of laser systems that serve for machining arbitrary materials. Accordingly, the material to be machined may be dead matter; but it may also be a question of living matter, for example tissue of a human eye.

In connection with the machining of materials, particularly those materials which are transparent in the visible spectral region, so-called femtosecond laser systems are gaining increasing importance. In this connection it is a question of laser systems is that generate a pulsed focused laser beam with pulse durations within the femtosecond range. Such femtosecond laser systems find application, for example, in laser-surgical ophthalmology, where they are ordinarily employed for the purpose of producing incisions in the corneal tissue or in other tissue regions of the human eye. An advantageous aspect of femtosecond laser systems is their suitability for generating three-dimensional incision figures that are arbitrary as such.

In the following the fundamental elementary process in connection with the machining of transparent materials by means of focused femtosecond laser radiation will be briefly elucidated. By virtue of the strong focusing of the laser beam into the material and on account of the transparency of the material in respect of the radiation, the laser power can be coupled into the interior without the transradiated material (e.g. corneal tissue) above the focal point being damaged. The process that takes place at the focal point is designated as photodisruption. At the focal point the threshold for the genesis of microplasma is exceeded by reason of the high-intensity radiation. Evaporation occurs of an extremely small sphere of material with a diameter of, for example, approximately 1 µm. As a result, a microbubble arises having a somewhat larger diameter, for example approximately 5-12 µm, which severs the surrounding material and subsequently diffuses completely into the environment. By virtue of the extremely short duration of action per laser pulse, no conduction of heat to the surrounding material is able to take place; all the effective energy as well as heat is dissipated again after the disappearance of the plasma.

In conventional femtosecond laser systems the focal point is capable of being controlled transversely and also longitudinally by means of a scanner. 'Transversely' in this connection means a direction in a plane that is orthogonal to the direction of beam propagation. 'Longitudinally', on the other hand, means a direction along the direction of propagation of the laser beam. If an appropriate number (for example, several thousand) of cavities that have arisen by virtue of plasma discharge are placed on top of one another three-dimensionally in the desired shape, the desired incision in the material arises.

The above process demands a very precise focal point with high peak intensity, in order to make the incisions with the desired accuracy. The focusability and the peak intensity are, however, sensitive parameters; comparatively slight perturbations in the path of propagation of the laser beam may already impair the spatial and temporal quality of the laser beam and hence the focusability and peak intensity thereof. During the machining of material it is therefore desirable to monitor the temporal and spatial quality of the laser beam continually (continuously or at least repeatedly at temporal intervals).

It is the object of the invention to specify a solution path in order to be able to monitor the radiation quality of the laser radiation in a laser system serving for the machining of material. Such a monitoring is intended to make it possible to interrupt the machining process or to react otherwise in the event of deterioration of the radiation quality. In particular, the monitoring is to be possible in real time, i.e. during the machining of material. In this case the radiation quality relates, in particular, to the focusability as well as the temporal progression of the pulse envelope (temporal envelope of the individual laser pulse), i.e. the brevity of the pulse duration. The focusability is crucially determined by the quality of the beam profile and of the wavefront of the laser radiation.

SUMMARY

For the purpose of achieving this object, according to one aspect of the invention a material-machining device is provided, comprising
  a laser for providing a pulsed laser beam,
  a measuring arrangement in order to obtain measured values of a fundamental-wave power of the laser beam and also of a power of at least one higher harmonic generated from the laser beam by frequency multiplication,
  an evaluating unit connected to the measuring arrangement, which has been set up to examine the quality of the laser beam in a manner depending on the measured fundamental-wave power, on the measured power of the higher harmonic, and on a set radiant power of the laser.

For the registering of the temporal or/and spatial radiation quality of pulsed laser radiation (in particular with femtosecond pulses) or for the purpose of registering changes in this quality, the invention teaches to investigate processes, the efficiency of which depends on the intensity of the applied, focused laser radiation. Non-linear frequency-mixing processes such as frequency doubling are an example of such processes. In this case, in an expedient configuration a (small) fraction of the laser radiation is focused into an optically non-linear crystal and transformed into radiation of double frequency. If an infrared wavelength of the laser radiation of the laser is assumed, the fraction of the radiation focused into the crystal is transformed, for example, into green light. Since the frequency doubling is dependent on the square of the incident power, the efficiency of this process is dependent on the applied power density (spatial and temporal) in the crystal and hence on the focusability and pulse duration of the laser radiation. Consequently it is possible—to the extent that other influencing parameters can be excluded—to attribute a change in the power of the frequency-doubled light to a change in the focusability or/and the pulse duration. Such a change may, for example, be caused by an impairment of the wavefront of the laser radiation or by a lengthening of the pulse duration.

It is a finding of the invention that, in general, it is costly and difficult to monitor all those parameters which may persistently influence the quality of the focus (i.e. the focusability) together simultaneously. In contrast, the methodology according to the invention enables a summary quality control in real time—i.e. online, so to speak. As soon as any one of these parameters influencing the generation of the focus becomes inferior, this can be detected via the measurement signal of the higher harmonics, and an appropriate response can be undertaken. For the operation of the material-machining device it can be regarded as irrelevant which concrete parameter is the cause of an observed deterioration of the focusability of the laser pulses. If the focusability is impaired, it is advisable to terminate the machining as quickly as possible after certain predetermined limits have been exceeded. Monitoring separately each individual laser parameter that is relevant for an effective generation of a focus and that may aggravate the focusability of the laser radiation would require an enormously high effort. It would also be decidedly difficult to realise an instantaneous and reliable reaction to a degradation of a single one of these parameters. In contrast, the possibility, afforded by the invention, of a summary online monitoring of all the laser parameters that are relevant for the focusability creates a considerable advantage, because the effort becomes appreciably slighter.

In principle, non-linear processes of higher order may also be employed within the scope of the invention; the central idea of the invention is by no means restricted to a frequency doubling. However, for higher-order processes higher intensities of radiation are, as a rule, required, which may increase the complexity of the solution according to the invention.

Optical frequency doubling is a special case of 3-wave mixing, in which, for high field strengths, out of two fundamental waves with angular frequencies $\omega 1$ and $\omega 2$ a third wave with angular frequency $\omega 3 = \omega 1 \pm \omega 2$ arises ($w = 2\pi f$). In this case, $\omega 3 = \omega 1 + \omega 2$ corresponds to the sum-frequency mixing and $\omega 3 = \omega 1 - \omega 2$ corresponds to the difference-frequency mixing. Now if in the special case of frequency doubling $\omega 1 = \omega 2$, then merely a sum frequency $\omega 3 = 2\omega 1 = 2\omega 2$ arises.

In a practical configuration of the invention a fraction of the laser radiation is applied into an optically non-linear medium (e.g. crystal). The applied fraction of the laser radiation is preferably focused into the non-linear medium. As a result of the high intensity at the focus, charge-carrier oscillations in the non-linear medium are excited which also contain harmonics of different order of the radiated fundamental oscillation (fundamental wave). In this case the second harmonic constitutes the frequency-doubled wave with twice the frequency and half the wavelength of the fundamental wave. By suitable choice of the direction of incident radiation into the non-linear medium or by suitable orientation of the non-linear medium relative to the direction of beam propagation, the generation of the second harmonic can be preferred over the other frequencies. For detailed theoretical description of this process, reference is made to the pertinent specialist literature; an elucidation in more detail can be dispensed with at this point.

In the above process the instantaneous intensity of the second harmonic is proportional to the square of the instantaneous intensity of the fundamental wave. The level of the signal of the second harmonic is crucially determined in this case by the peak intensity of the fundamental wave. Said peak intensity depends, in turn, on the pulse energy, on the spot size (square of the waist radius) of the fundamental wave at the focus, and also on the pulse duration of the fundamental-wave radiation. Since the efficiency of the frequency doubling (conversion efficiency)—defined as the quotient of the temporally averaged power of the second harmonic and the temporally averaged power of the fundamental-wave radiation—is equally proportional to the fundamental-wave power and hence to the peak intensity of the fundamental-wave radiation, for the conversion efficiency a dependence on the spot size of the fundamental-wave radiation at the focal point and on its pulse duration also holds. Given constant pulse energy of the fundamental-wave radiation, a change in the conversion efficiency permits a change in the temporal or/and spatial beam quality (pulse envelope, beam profile, etc) or/and a change in the shape of the wavefront and hence a change in the focusability to be inferred.

In a preferred configuration of the invention, the length of a crystal that is used by way of optically non-linear medium is significantly greater than the Rayleigh length of the fundamental-wave radiation focused into the crystal. Slight changes in the divergence of the fundamental-wave radiation (slight shift of the focal plane in the doubler crystal) then hardly have any effect on the intensity signal of the second harmonic.

In addition, the fundamental-wave radiation is preferentially focused into the crystal with comparatively short focal length, in order to lessen the dependence of the phase matching on the direction and spectral distribution of the power applied into the crystal. By focusing of the applied fundamental-wave radiation it is possible that, even in the case of a slight change in the direction of incident radiation of the fundamental-wave radiation or of the medium wavelength of the fundamental-wave radiation, suitable radiation components are always present for which phase matching obtains. Accordingly, a comparatively large angular range of the direction of incident radiation can be obtained, for which an at least approximately identical intensity signal of the second harmonic can be obtained. So long as the laser source is operating within its specifications, accordingly it does not affect the measuring process, or at least affects it only slightly.

If, on the other hand, the pulse duration or/and the focusability changes, for example as a result of wavefront distortions of the fundamental-wave radiation, this effect is not compensated; instead, it has a direct effect on the conversion efficiency. With a contaminated disc inserted into the beam path of the fundamental-wave radiation, wavefront distortions, for example, can be simulated in which the fundamental-wave power under certain circumstances is for the most part or totally preserved. Since small flat wave surfaces are more discernible, a good focus can then no longer be achieved, for which reason the frequency doubling is massively attenuated or even comes to a halt. The change in the power of the second harmonic is accordingly associated with a change in the wavefront of the fundamental-wave radiation. Wavefront distortions in the laser system can therefore be detected by monitoring the power of the second harmonic (or of another, higher harmonic) and by comparison of this power with a reference power, which is preferentially representative of that power of the second harmonic which can be achieved at best with given fundamental-wave power. In this way, an aggravated beam quality of the fundamental-wave radiation without substantial loss of power can be detected very sensitively and instantaneously—i.e. in real time—and a response can be undertaken correspondingly quickly before greater decreases in power are detectable.

An exemplary way of proceeding in order to monitor, in real time, the beam quality of a machining laser beam provided by a laser system may consist in a calibration operation firstly being carried out in which the laser is set to various (nominal) radiant powers within its possible power range and at each set radiant power the fundamental-wave power and also the power of the second (or of another higher) harmonic being measured. The calibration operation should in this case be carried out in an interference-free state of the laser system with best focusability of the fundamental-wave radiation. In this way it can be ensured that the measured values of the fundamental-wave power and also of the power of the higher harmonic represent maximum or optimum values. These maximum values represent the maximally obtainable powers of the fundamental wave and of the higher harmonic at the radiant power that has been set in the given case.

By formation of the quotient (power of the second harmonic divided by fundamental-wave power), in addition a value of the conversion efficiency can be ascertained, assigned to each set radiant power of the laser.

The data obtained within the scope of the calibration operation may, for example, be stored in tabular form in a memory.

During the subsequent machining of material, again the fundamental-wave power and also the power of the higher harmonic are measured continuously or at temporal intervals. Then two separate checking steps can be carried out. In a first checking step, the measured fundamental-wave power can be compared with a reference value. This reference value is ascertained from the data stored in the memory and obtained within the scope of the calibration operation. It represents the optimal value of the fundamental-wave power at the set radiant power of the laser. If the measured fundamental-wave power does not deviate substantially from the reference value or if it lies within predetermined permissible limits in relation to the reference value, this means that at least no faults are present which may significantly impair the power of the laser beam. If, however, a deviation is present that is greater than a predetermined permissible limit, this may be taken as a cause to trigger a predetermined warning response or emergency response which, for example, may include the output of a warning indication or/and a shutdown of the laser.

In a second checking step, in addition the measured power of the higher harmonic can be compared with a reference value or/and the conversion efficiency (quotient of measured power of the higher harmonic and measured fundamental-wave power) can be compared with a reference value. The reference values of the power of the is higher harmonic and of the conversion efficiency are also ascertained from the stored calibration data; they specify desired values (optimal values) of the power of the higher harmonic and, respectively, the conversion efficiency at the nominally set radiant power of the laser, i.e. at the operating point of the laser. If the comparison shows a deviation beyond predetermined limits, a warning response or emergency response can be triggered, as elucidated previously. If, on the other hand, both the first and second checking steps (which, of course, do not necessarily have to be performed in this order) show no impermissible deviations, the output of the laser beam can be permitted and the operation of the material-machining device can be continued unhindered.

With the second checking step it is possible, in particular, to detect faults that bring about no power attenuation or only a slight power attenuation of the laser beam but cause significant wavefront distortions. In the case of undesirable wavefront perturbations, the ratio of measured to maximum power of the second harmonic can readily fall to a few percent (for example, below 15 percent), which shows that the power of the second harmonic is a good indicator of the beam quality of a laser beam.

According to preferred further developments of the material-machining device according to the invention, the at least one higher harmonic may include the second harmonic, and the pulse duration of the laser beam preferentially lies within the femtosecond range.

The evaluating unit may have been set up to compare at least one of the measured power values or/and a value derived therefrom (for example, conversion efficiency) with at least one reference value and, depending on the extent of a deviation of the measured value or of the derived value from the reference value, to bring about a predetermined response. In this case the reference value may represent a maximally achievable value of the fundamental-wave power at the set radiant power of the laser, the power of the higher harmonic, or a conversion efficiency of the frequency multiplication.

The evaluating unit may further have been set up to take the reference value from information stored in advance which, assigned to a plurality of different set radiant powers of the laser, represents reference values of the fundamental-wave power or/and the power of the higher harmonic or/and a conversion efficiency of the frequency multiplication. Alternatively or additionally, the evaluating unit may have been set up to ascertain a quotient from the measured power of the higher harmonic and from the measured fundamental-wave power or/and to ascertain a quotient from the measured power of the higher harmonic and from a reference value of the power of the higher harmonic and to examine the beam quality in a manner depending on the ascertained quotient.

The evaluating unit may, in addition, be part of an electronic control arrangement which has been set up to control the output of the laser beam in a manner depending on the extent of the deviation of the measured value or of the derived value from the reference value. For example, it may permit the output of the laser beam if the ascertained deviation lies within predetermined limits, or/and it may prevent the output of the laser beam if the ascertained deviation lies outside such limits.

The measuring arrangement may include, for the purpose of generating the higher harmonic, an optically non-linear medium and also a focusing unit connected upstream of this medium for the purpose of focusing a partial beam coupled out of the laser beam onto the non-linear medium. It may further have been set up to measure by way of fundamental-wave power the power of a partial beam coupled out of the laser beam.

The evaluating unit may be part of an electronic control arrangement which has been set up to set in succession, in a calibrating process, a plurality of different radiant powers of the laser, to ascertain, assigned to each set radiant power of the laser, measured values of the fundamental-wave power and the power of the higher harmonic, and to store the ascertained measured values or/and values derived therefrom in a memory, assigned to the various radiant powers of the laser.

According to a further aspect, the invention provides a process for operating a material-machining device operating with a pulsed laser beam, in particular a material-machining device according to one of the preceding claims, comprising measuring a fundamental-wave power of the laser beam and a power of at least one higher harmonic generated from the laser beam by frequency multiplication, comparing at least one of the measured power values or/and a value derived therefrom with at least one reference value, bringing about a predetermined response in a manner depending on the extent of a deviation of the measured value or of the derived value from the reference value.

The process may further include the prior implementing of a calibrating process in which measured values of the fundamental-wave power and the power of the higher harmonic are obtained in the case of a plurality of different set radiant powers of a laser providing the laser beam and the obtained measured values or/and values derived therefrom are stored in a memory, assigned to the various radiant powers of the laser, the reference value being obtained from the measured values or/and derived values stored in the memory.

The predetermined response may include an optical or/and acoustic message or/and an enabling or a shutdown of the laser beam. Furthermore, the steps of measuring and comparing can be carried out repeatedly, in particular at regular temporal intervals, during the machining of a material with the laser beam. In this way, an online monitoring in real time, so to speak, is possible, the monitoring frequency depending on the time-interval at which the measurements are carried out. In this respect there are no limits as such predetermined by the invention—i.e. measurement can be effected as often as the measuring apparatus and the available computing power permit.

DETAILED DESCRIPTION

The invention will be elucidated in greater detail in the following on the basis of the appended single drawing.

FIG. 1 thereof shows schematically an exemplary embodiment of a material-machining device for laser machining of a material. The material-machining device designated generally by 10 serves, in the exemplary case shown, for the laser-surgical machining of a human eye 12 and, for example, for making intracorneal tissue incisions therein. It includes a laser source 14 which generates a pulsed laser beam 16 with pulse durations within the femtosecond range. The laser source 14 includes, for example, a fibre laser. Moreover, the material-machining device 10 includes focusing optics 18 for focusing the laser beam 16 onto the object to be machined, here the eye 12. The focusing optics 18 are, for example, constituted by an f-theta objective. Connected upstream of the focusing optics 18 is a scanner 20 which serves for transverse and longitudinal control of the focal position of the laser beam 16. For the purpose of transverse deflection, the scanner 20 may, for example, include a galvanometrically controlled mirror-pair or an electrically controlled deflecting crystal. For the longitudinal focus control, the scanner 20 may, for example, include an optical element influencing the divergence of the laser beam 16, for instance a lens that is longitudinally displaceable in the direction of beam propagation or a liquid lens of variable refractive power or a deformable mirror. It will be understood that the components of the scanner 20 responsible for the transverse focus control and those responsible for the longitudinal focus control of the laser beam 16 may be arranged at different places along the direction of propagation of the laser beam 16. The scanner 20 accordingly does not have to be a compact unit; it may be a question of a distributed arrangement of various scan components.

For the purpose of controlling the laser source 14 and the scanner 20, a microprocessor-assisted control unit 22 is provided which operates in accordance with a control program stored in a memory 24. The control program contains suitable control parameters (for example, in the form of coordinates for the individual shot positions of the laser pulses) which define the incision geometry to be produced.

For the production of fine and precise incisions by means of the laser beam 16, a high spatial and temporal beam quality is desirable. For real-time monitoring of the beam quality of the laser beam 16 the material-machining device 10 exhibits means in order to couple two partial beams 16' 16" out of the laser beam 16 in the direction of beam propagation upstream of the transverse deflection by the scanner. In the exemplary case shown, these means include two semi-transmitting splitting mirrors 26, 28 arranged in series in the beam path of the laser beam 16. A first power meter 30 serves for measuring the (temporally averaged) radiant power of partial beam 16'. For this purpose the power meter 30 includes, for example, a photodiode and provides to the control unit 22 a signal that is representative of the measured radiant power, in particular proportional thereto. The power measured by the power meter 30 corresponds to a fundamental-wave power in the sense of the invention.

The second partial beam 16" is focused by means of a focusing lens 32 onto an optically non-linear crystal 34 (or another non-linear medium) in which by virtue of non-linear processes a frequency-doubled beam 16''' is generated which is subsequently freed of any possible perturbing subordinate lines and also residues of the fundamental wave by means of an optical band-pass filter 36. A second power meter 38, which again may include, for example, a photodiode for radiation detection, serves for measuring the (temporally averaged) power of the frequency-doubled beam 16''' and provides a signal to the control unit 22 that is representative of the measured power. The measured power of the frequency-doubled beam 16''' represents a power of a higher (here, second) harmonic generated from the fundamental wave in the sense of the invention.

The wavelength of the laser beam 16 generated by the laser source 14 lies, for example, within the infrared range between 1000 nm and 1100 nm. In this way, by virtue of frequency doubling in the non-linear crystal 34 a green to yellowish-green light beam 16''' arises.

The control unit 22 computes a conversion efficiency from the measured power signals provided by the power meters 30, 38, by dividing the measured power of the light beam 16''' by the measured power of the partial beam 16'.

In the memory 24 there are additionally saved calibration data which were ascertained by the control unit 22 in a preceding calibration process. The calibration data specify for different nominal values of the radiant power of the laser 14 in each instance a reference value for the power of the partial beam 16', for the power of the frequency-doubled beam 16''' and also for the conversion efficiency. The differing radiant powers of the laser 14 correspond to differing operating points. The laser 14 is capable of being operated within a range of radiant powers; depending on the application, the control unit 22 can set a different operating point of the laser 14. For example, the various radiant powers are represented by percentage values which define the respective operating point by a percentage figure relating to a maximally settable radiant power of the laser 14. The stored reference values relate in each instance to an optimal situation—i.e. a fault-free operation without (at least without substantial) undesirable wavefront distortions of the laser beam 16 and without (at least without substantial) undesirable power attenuation of the laser beam 16 along the path of propagation thereof. They accordingly represent the best possibly obtainable values of the power of the partial beam 16', of the power of the frequency-doubled beam 16''' and of the conversion efficiency.

The currently measured power values for the partial beam 16' and for the frequency-doubled beam 16''' are used by the control unit 22 in order to examine the beam quality of the laser beam 16 on the basis of a comparison with the calibration data stored in the memory 24. In concrete terms, the control unit 22 checks whether the measured power of the partial beam 16' corresponds at least approximately to that reference value which is stored in the memory 24 for the fundamental-wave power at the relevant operating point of the laser 14. In this way, the control unit 22 can detect undesirable power attenuations of the laser beam 16 in comparison with the fault-free case.

Furthermore, the control unit 22 checks whether the measured power of the frequency-doubled beam 16''' corresponds at least approximately to that reference value which is contained in the stored calibration data for the power of the second harmonic at the relevant operating point of the laser 14. Alternatively or additionally, the control unit 22 checks whether the computed conversion efficiency (computed as the quotient of the measured power of the light beam 16''' and the measured power of the partial beam 16') corresponds at least approximately to that reference value which is contained in the calibration data for the conversion efficiency at the relevant operating point of the laser 14. The checking of the measured power values or of the conversion efficiency derived therefrom for conformity with the stored reference values may, for example, include a subtraction or/and a formation of a quotient. Since the reference values specify optical values that are achievable in fault-free operation of the material-machining device 10 in the case of optimal focusability of the laser beam 16, any possible deviations between the measured powers or the computed conversion efficiency from the reference values are an indicator of undesirable power attenuations or/and undesirable wavefront distortions or/and undesirable lengthenings of the pulse duration of the laser beam 16. If the ascertained deviations exceed a predetermined extent, the control unit 22 can interrupt the output of the laser beam 16.

The aforementioned calibration process can be carried out by the control unit 22 automatically, for example every time when the material-machining device 10 is switched on or when a user enters a suitable start command for implementing the calibration. Within the scope of the automatic calibration process the control unit 22 can set different operating points of the laser 14 in succession and store the respectively ascertained measured values of the fundamental-wave power and of the power of the second harmonic in the memory 24.

For the purpose of focusing the second partial beam 16", instead of the lens 32 use may also be made of a diffractive optical element, for example. The non-linear medium 34 may be, for example, a periodically polarised crystal. The crystal may be temperature-stabilised, in which case the phase matching can be optimised via the temperature. Furthermore, it is possible to work in accordance with the method of non-critical phase matching known as such in the specialist field.

What is claimed is:

1. Material-machining device, comprising:
a laser for providing a pulsed laser beam configured to machine a portion of a human eye,
a measuring arrangement optically coupled to the laser in order to obtain measured values of a fundamental-wave power of the laser beam from a first partial beam split from the laser beam and also of a power of at least one higher harmonic generated by frequency multiplication from a second partial beam split from the laser beam,
an evaluating unit connected to the measuring arrangement, which has been set up to evaluate the quality of the laser beam based on the measured fundamental-wave power, on the measured power of the higher harmonic, and on a set radiant power of the laser.

2. Material-machining device according to claim 1, wherein the at least one higher harmonic includes the second harmonic.

3. Material-machining device according to claim 2, wherein the evaluating unit has been set up to compare at least one of the measured power values with at least one reference value and, when the measured value deviates from the reference value by more than a predetermined amount, to bring about a predetermined response.

4. Material-machining device according to claim 3, wherein the reference value represents a maximally achievable value of the fundamental-wave power at the set radiant power of the laser, the power of the higher harmonic, or a conversion efficiency of the frequency multiplication.

5. Material-machining device according to claim 3, wherein the evaluating unit has been set up to take the reference value from reference information stored in memory and assigned to a plurality of different set radiant powers of the laser, the reference information including reference values for at least one of the fundamental-wave power, the power of the higher harmonic, and a conversion efficiency of the frequency multiplication.

6. Material-machining device according to claim 3, wherein the evaluating unit has been set up to:
ascertain at least one of:
a quotient from the measured power of the higher harmonic and from the measured fundamental-wave power, and
a quotient from the measured power of the higher harmonic and from a reference value of the power of the higher harmonic; and
evaluate the beam quality based on the ascertained quotient.

7. Material-machining device according to claim 3, wherein the measured value of the fundamental-wave power of the laser beam is derived from a signal generated by a first power meter in optical communication with the first partial beam.

8. Material-machining device according to claim 7, wherein the measured value of the power of the at least one higher harmonic is derived from a signal generated by a second power meter in optical communication with the second partial beam.

9. Material-machining device according to claim 8, further comprising:
a first beam splitter in optical communication with the laser beam for generating the first partial beam; and
a second beam splitter in optical communication with the laser beam for generating the second partial beam.

10. Material-machining device according to claim 9, further comprising:
a scanner for controlling a focal position of the laser beam;
wherein the first and second beam splitters are positioned between the laser and the scanner along an optical path of the laser beam.

11. Material-machining device according to claim 1, wherein the evaluating unit is part of an electronic control arrangement which has been set up to control the output of the laser beam in a manner depending on the extent of the deviation of the measured value from the reference value.

12. Material-machining device according to claim 1, wherein for the purpose of generating the higher harmonic the measuring arrangement includes an optically non-linear medium and a focusing unit connected upstream of this medium for the purpose of focusing the second partial beam onto the non-linear medium.

13. Material-machining device according to claim 1, wherein the evaluating unit is part of an electronic control arrangement which has been set up to set in succession, in a calibrating process, a plurality of different radiant powers of the laser, to ascertain for each of the plurality of different radiant powers of the laser, measured values of the fundamental-wave power and the power of the higher harmonic, and to store the ascertained measured values.

14. Material-machining device according to claim 1, wherein the pulse duration of the laser beam is within the femtosecond range.

15. A method of controlling a material-machining device having a laser source for producing a pulsed laser beam, the method comprising:
generating a laser beam from the laser source of the material-machining device and directing the laser beam towards a portion of an eye;

measuring a fundamental-wave power of the laser beam from a first partial beam split from the laser beam;

measuring a power of at least one higher harmonic generated by frequency multiplication from a second partial beam split from the laser beam;

comparing at least one of the measured power values with at least one reference value; and when the comparison indicates that the measured value deviates from the at least one reference value by more than a predetermined amount, bringing about a predetermined response from the material-machining device.

16. The method according to claim 15, further comprising:

implementing a calibrating process in which measured values of the fundamental-wave power and the power of the higher harmonic are obtained for a plurality of different set radiant powers of the laser source and the obtained measured values are stored in a memory and assigned to the plurality of set radiant powers of the laser source, wherein the at least one reference value is obtained from the measured values stored in the memory.

17. The method according to claim 15, wherein the predetermined response includes at least one of an optical message, an acoustic message, a shutdown of the laser source, and an enabling of the laser source.

18. The method according to one of claims 15 to 17, wherein the steps of measuring and comparing are carried out repeatedly, at regular temporal intervals, during the machining of the eye with the laser beam.

19. A laser system, comprising:

a laser source configured to generate a pulsed laser beam having pulse durations in a femtosecond range;

a first beam splitter in optical communication with the pulsed laser beam for generating a first partial beam;

a first power meter in optical communication with the first partial beam, the first power meter configured to generate a signal representative of a fundamental-wave power of the pulsed laser beam;

a second beam splitter in optical communication with the pulsed laser beam for generating a second partial beam;

a non-linear medium in optical communication with the second partial beam and configured to generate a frequency-doubled beam from the second partial beam;

a second power meter in optical communication with the frequency-doubled beam, the second power meter configured to generate a signal representative of power of a second harmonic of the pulsed laser beam;

a scanner in optical communication with the pulsed laser beam and configured to control a focal position of the pulsed laser beam; and a control unit in communication with the laser source, the first power meter, the second power meter, and a memory, the control unit configured to control operation of the laser source by:

comparing the signal representative of the fundamental-wave power of the pulsed laser beam from the first power meter to a fundamental-wave power reference value stored in the memory;

comparing the signal representative of the power of the second harmonic of the pulsed laser beam from the second power meter to a second-harmonic power reference value stored in the memory; and controlling the generation of the pulsed laser beam from the laser source in response to the comparisons of the signal representative of the fundamental-wave power of the pulsed laser beam to the fundamental-wave power reference value and of the signal representative of the power of the second harmonic of the pulsed laser beam to the second-harmonic power reference value.

20. The laser system of claim 19, wherein the control unit is configured to prevent the generation of the pulsed laser beam if the comparison of the signal representative of the fundamental-wave power of the pulsed laser beam to the fundamental-wave power reference value indicates a deviation greater than an accepted deviation value.

21. The laser system of claim 19, wherein the control unit is configured to prevent the generation of the pulsed laser beam if the comparison of the signal representative of the power of the second harmonic of the pulsed laser beam to the second-harmonic power reference value indicates a deviation greater than an accepted deviation value.

* * * * *